(12) United States Patent
Karim et al.

(10) Patent No.: US 10,182,194 B2
(45) Date of Patent: Jan. 15, 2019

(54) METHOD AND APPARATUS FOR IMPROVED DETECTIVE QUANTUM EFFICIENCY IN AN X-RAY DETECTOR

(71) Applicants: Karim S. Karim, Waterloo (CA); Ian A. Cunningham, London (CA)

(72) Inventors: Karim S. Karim, Waterloo (CA); Ian A. Cunningham, London (CA)

( * ) Notice: Subject to any disclaimer, the term of this patent is extended or adjusted under 35 U.S.C. 154(b) by 0 days.

(21) Appl. No.: 15/434,712

(22) Filed: Feb. 16, 2017

(65) Prior Publication Data

US 2017/0244910 A1    Aug. 24, 2017

Related U.S. Application Data

(60) Provisional application No. 62/297,336, filed on Feb. 19, 2016, provisional application No. 62/298,076, filed on Feb. 22, 2016.

(51) Int. Cl.
| | |
|---|---|
| *G01T 1/24* | (2006.01) |
| *H04N 5/32* | (2006.01) |
| *H04N 5/357* | (2011.01) |
| *H04N 5/3745* | (2011.01) |

(52) U.S. Cl.
CPC .......... *H04N 5/32* (2013.01); *G01T 1/24* (2013.01); *H04N 5/357* (2013.01); *H04N 5/37455* (2013.01)

(58) Field of Classification Search
CPC . G01T 1/24; H04N 5/32; H04N 5/357; H04N 5/37455
See application file for complete search history.

(56) References Cited

U.S. PATENT DOCUMENTS

| | | | | |
|---|---|---|---|---|
| 6,289,078 B1* | 9/2001 | Snoeren | ............ | H05G 1/36 378/98.7 |
| 6,459,754 B1* | 10/2002 | Besson | ............ | A61B 6/032 378/15 |
| 2003/0116713 A1* | 6/2003 | Cooke | ............ | G01T 1/1647 250/369 |
| 2006/0280281 A1* | 12/2006 | Flohr | ............ | A61B 6/4241 378/5 |
| 2009/0039298 A1* | 2/2009 | Kulpinski | ............ | G01T 1/2014 250/585 |
| 2009/0290680 A1* | 11/2009 | Tumer | ............ | G01T 1/247 378/62 |
| 2010/0204942 A1 | 8/2010 | Danielsson et al. | | |
| 2010/0215230 A1 | 8/2010 | Bornefalk et al. | | |
| 2011/0116700 A1 | 5/2011 | Li et al. | | |

(Continued)

OTHER PUBLICATIONS

Canadian Intellectual Property Office as International Searching Authority, International Search Report and Written Opinion for PCT Patent Appln. No. PCT/CA2017/050200, dated Apr. 27, 2017.

*Primary Examiner* — Marcus Taningco
(74) *Attorney, Agent, or Firm* — Gowling WLG (Canada) LLP; Jeffrey W. Wong (57) ABSTRACT

The disclosure is directed at a method and apparatus for improving method and apparatus for improved modulation transfer function and detective quantum efficiency of X-ray detectors. The method and apparatus include digitizing microelement outputs obtained by micro sensor elements and the generating pixel outputs from these digitized microelement outputs. Each pixel output is the sum of a plurality of weighting factored microelement outputs.

11 Claims, 10 Drawing Sheets

(56) References Cited

U.S. PATENT DOCUMENTS

| | | |
|---|---|---|
| 2011/0303849 A1 | 12/2011 | Tredwell et al. |
| 2015/0063545 A1 | 3/2015 | Lee et al. |
| 2015/0146853 A1* | 5/2015 | Spartiotis ............... A61B 6/466 378/62 |
| 2017/0086769 A1* | 3/2017 | Allmendinger ........ A61B 6/032 |

* cited by examiner

| 0) | 1) | 2) | 3) |
|---|---|---|---|
| Incident X-rays | Quantum gain, g | Collection of $q_s$ in elements of size 'a' | Sampling at spacing 'a' |

METHOD AND APPARATUS FOR IMPROVED DETECTIVE QUANTUM EFFICIENCY IN AN X-RAY DETECTOR

CROSS-REFERENCE TO OTHER APPLICATIONS

This application claims the benefit of U.S. Provisional Patent Application No. 62/297,336, filed Feb. 19, 2016, and U.S. Provisional Patent Application No. 62/298,076 filed Feb. 22, 2016 which are incorporated herein by reference.

FIELD OF THE DISCLOSURE

The disclosure is generally directed at X-ray detectors and, more specifically, to a method and apparatus for improved modulation transfer function and detective quantum efficiency of X-ray detectors.

BACKGROUND OF THE DISCLOSURE

The known risks associated with exposure to radiation is a key motivator for the development of new detector technologies able to produce better images using lower patient exposures. In diagnostic radiology, lower patient exposures generally result in fewer x-ray quanta interacting in the detector and reduced image signal-to-noise ratio (SNR). Image SNR, expressed as a spatial-frequency-dependent noise-equivalent number of quanta (NEQ) determines what can and cannot be seen in a noise-limited image. For example, a recent comparison of diagnostic accuracy using computed radiography (CR) and flat-panel digital radiography (DR) in a breast cancer screening program found DR had a better cancer detection rate compared to CR, attributed to a difference in system modulation transfer function (MTF) and image SNR. The detective quantum efficiency (DQE), initially called the equivalent quantum efficiency, describes the NEQ for a given number of x-ray quanta incident on a detector.

The DQE of an ideal detector would be equal to the quantum efficiency (fraction of x-ray quanta that interact in the detector) for all spatial frequencies of importance. However, in practice the DQE always decreases further with increasing frequency due to a number of considerations, including: resolution loss as described by the MTF; scatter of secondary quanta (optical scatter in a phosphor or charge migration in a photoconductor); reabsorption or escape of characteristic emissions from photo-electric interactions and Compton scatter; and noise aliasing. Noise aliasing is the primary cause of DQE degradation with frequency for a-Se detectors at mammographic energies, reducing the SNR for visualizing small lesions and fine image details.

Therefore, there is provided a novel method and apparatus for improved modulation transfer function and detective quantum efficiency in an X-ray detector.

SUMMARY OF THE DISCLOSURE

The disclosure provides a novel method and apparatus for improved modulation transfer function (MTF) and detective quantum efficiency (DQE) in an X-ray detector for use in radiography, mammography, computed tomography, and nuclear-medicine imaging. In one embodiment, the disclosure provides a method and apparatus for achieving a flatter DQE response by improving the MTF, removing or reducing noise aliasing or both.

The apparatus of the disclosure includes a sensor array with physical sensor elements that are smaller than a desired image pixel size. Image pixel values are synthesized from the measured sensor-array data while implementing an anti-aliasing filter, resulting in an apodized-aperture pixel (AAP) structure. In one embodiment, this may be achieved using a CMOS sensor array or other technology coupled to a high-resolution conversion layer such as, but not limited to, selenium, cesium iodide or gadolinium oxysulfide. The process of synthesizing image pixels from the large number of small sensor elements could be implemented directly on the sensor array, eliminating or reducing the need for a very high readout bandwidth to transfer the large amount of sensor-array data for post processing.

In another embodiment, the disclosure introduces a controlled signal sharing between sensor elements using a deterministic weighting. That is, the signal from each micro sensor element is combined with signals from other micro sensor elements using predetermined weighting factors to synthesize detector values used to generate image pixel values. In this way, each detector output element value is generated by combining a measured signal from several micro sensor elements with predetermined weighting factors.

In one aspect of the disclosure, there is provided a method of improving modulation transfer function (MTF) and detective quantum energy (DQE) in a digital flat panel X-ray detector including sensing X-ray energy received by a set of microelements; generating a microelement output for each of the set of microelements based on the sensed X-ray energy; and generating a set of pixel outputs for a desired pixel image size based on at least two weighting factored microelement outputs.

In another aspect, generating a set of pixel outputs includes retrieving a set of microelement outputs; applying a weighting factor to each of the retrieved microelement outputs to generate a set of weighting factored microelement outputs; and calculating a sum of the set of weighting factored microelement outputs. In yet another aspect, the weighting factor includes at least one of a sine function, a weighting factor to provide a modified frequency response weight factor to enhance or suppress other spatial frequencies; a weighting factor to enhance signal-to-noise ratio in the output image or a weighting factor to enhance image quality.

In another aspect, the method further includes transmitting the set of pixel outputs. In a further aspect, generating a microelement output includes determine a level of energy sensed by the microelement; and digitizing the level of energy sensed to generate the microelement output. In another aspect, a size of a microelement is less than the size of a desired pixel image size.

In another aspect of the disclosure, there is provided a detector for use in improving modulation transfer function (MTF) and detective quantum energy (DQE) in a digital flat panel n X-ray detector including a converter layer for receiving X-ray energy and for liberating secondary quanta; and a sensor layer including a set of microelements for sensing the secondary quanta to generate microelement outputs for calculation of a set of pixel outputs based on a desired image pixel size; wherein a size of each of the set of microelements is less than the desired image pixel size.

In yet another aspect, the detector further includes at least one analog-to-digital (A/D) converter for digitizing energy sensed by the set of microelements to microelement outputs. In a further aspect, the detector further includes a central processing unit for generating a set of pixel outputs. In another aspect, the set of pixel outputs is generated by adding at least two weighting factored microelement outputs.

DESCRIPTION OF THE DRAWINGS

Embodiments of the present disclosure will now be described, by way of example only, with reference to the attached Figures.

DETAILED DESCRIPTION

The disclosure is directed at a method and apparatus for improved modulation transfer function (MTF) and detective quantum efficiency (DQE) of X-ray detectors. Both MTF and DQE are typically expressed as a curve as a function of spatial frequency, or as particular values at particular spatial frequencies. In one embodiment, the disclosure is directed at improving or optimizing a MTF curve along with DQE values using data from small pixels, or microelements, within the X-ray detector.

For clarity, in the following description, the term "signal" refers to charges collected in the microelements that were liberated either directly or indirectly from the absorption of X-ray energy. Direct-type sensors are sensitive to charges liberated directly by absorption of X-ray energy while indirect-type sensors are sensitive to charges liberated by the absorption of optical quanta that were generated as a result of absorption of X-ray energy. The term signals may also include other measurable quantities resulting from the absorption of X-ray energy. The term "numerical signal" refers to a signal that has been converted to a numerical value using an analog-digital converter (ADC) circuit.

Figure 1:
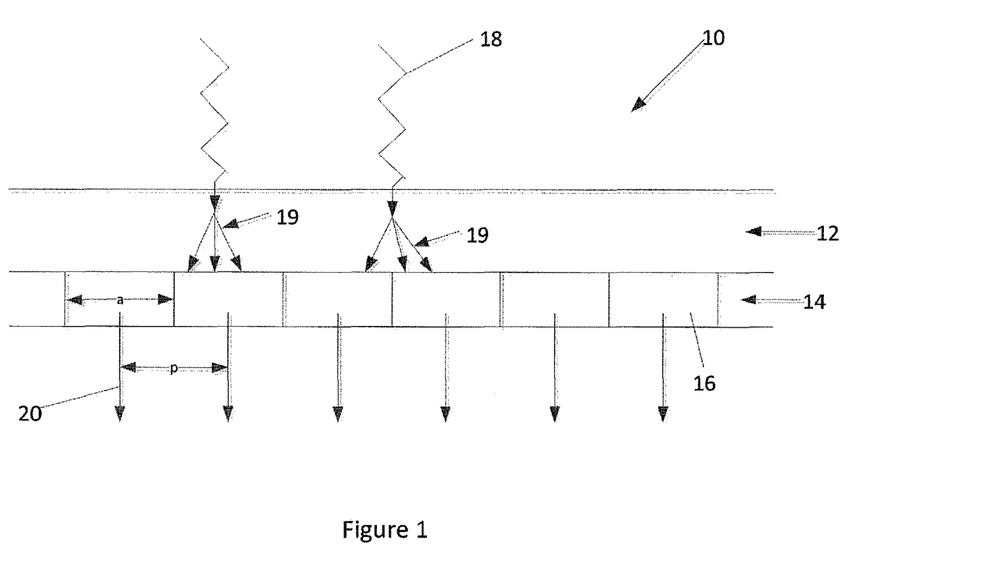
FIG. 1 is a schematic diagram of a conventional X-ray detector.

Turning to FIG. 1, a schematic diagram of a conventional X-ray detector is shown. The detector 10 includes a converter layer 12 and a sensor layer 14. The sensor layer 14 includes a set of physical sensor elements 16 for sensing incident X-rays 18. In conventional detectors, the physical sensor elements may be seen as having a size "a" which is typically the same as a desired image pixel size "p".

In operation, the X-rays 18 deposit a signal on the physical sensor elements 16 either directly or indirectly. After the X-rays 18 interact with the converter layer 12 and liberate secondary quanta 19 in the converter layer 12, the liberated secondary quanta 19 are sensed or captured by the sensor elements 16 which generate an output 20. The output 20 may be an analog signal such as a charge or voltage. The output 20 is generally proportional to a measured signal for each physical sensor element 16. It is normal in a conventional detector to correct these values for differences in sensor gain and offset to achieve values proportional to the measured signal for each sensor element.

The resulting signals 20 from each of the elements 16 produce a numerical value proportional to the deposited X-ray energy on each element 16. The detector 10 then produces the output 20 that includes an array of the numerical values corresponding to the measured signal at the spaces "a" of the detector where the number of values in the array equals the number of physical sensor elements. As such, each numerical value is normally given by the digitized signal from one physical sensor element 16. In some detectors, signals 20 may be summed into non-overlapping groups (typically 2×2, 3×3 or 4×4 elements per group). This summing is normally performed by combining signal 20 in analog form. This has the effect of reducing the number of outputs 20 and thereby increasing the desired image pixel size "p".

The signal from any one interacting X-ray photon is measured primarily in a single physical sensor element 16, corresponding to a single image pixel, although there may be some signal sharing between image pixels (i.e. between sensor elements) caused by light or charge sharing between elements. Conventional detectors are designed to minimize this signal sharing between elements to achieve high spatial resolution.

Figure 2A:
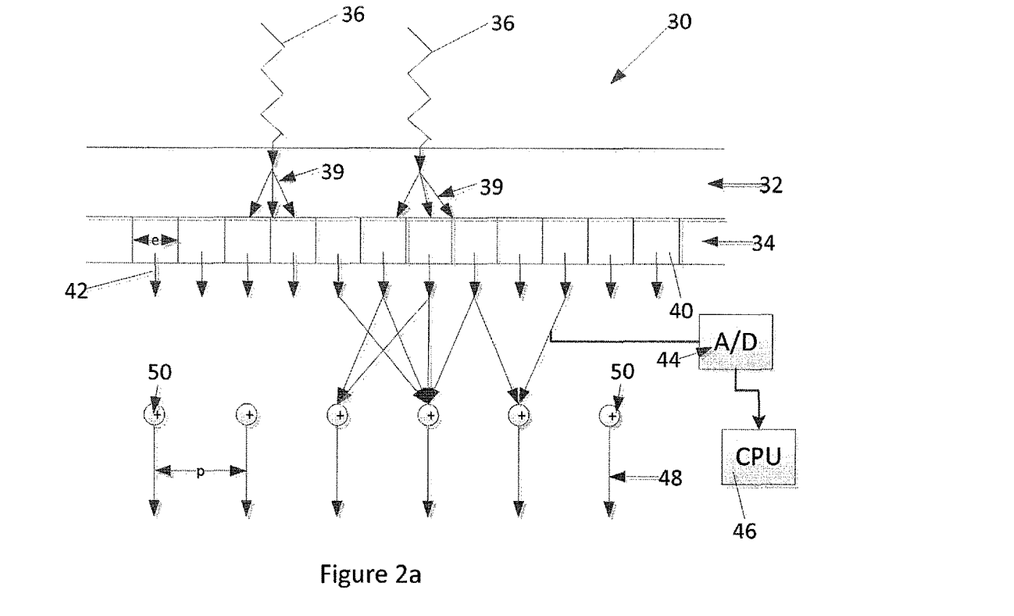
FIG. 2a is a schematic diagram of a first embodiment of an X-ray detector in accordance with the current disclosure.

Turning to FIG. 2a, a schematic diagram of an apodized aperture pixel (AAP) detector in accordance with the disclosure is shown. The AAP detector 30 includes an AAP converter layer 32 which sits atop an AAP sensor layer 34 for receiving X-rays 36. The AAP sensor layer 34 includes micro sensor elements, or microelements 38 of size "e" which is smaller than a desired image pixel size "p". For some applications, "p" may be 0.05 to 0.2 mm for radiography and mammography, 0.25 to 2.5 mm for computed tomography, and between 1 to 5 mm for nuclear medicine imaging. Unlike a conventional detector, in the detector of the disclosure multiple microelements 38 contribute to pixel outputs corresponding to the individual pixels whereby e is always less than p.

In operation, the X-rays 36 deposit signals onto the microelements 38. The resulting signal from each microelement 38 is then digitized, such as by an ADC 44 to produce a numerical signal or value (or microelement output) 42 proportional to the X-ray energy deposited or sensed by each microelement 38. The numerical values 42 from each microelement 38 are then combined with weighting factors 50, such as via processor, or central processing unit (CPU) 46, to generate numerical values corresponding to spacings "p" of the AAP detector 30. The combination of using microelements 38 of size "e" along with weighting factors to create pixel outputs 48 at spacings "p" where "e" is smaller than "p", enables the method of the disclosure. The relationship between "e" and "p" is preferably 2:1, 3:1, 4:1 or 8:1, however, any ratio may be used and is application or use specific. The higher the ratio between "e" and "p" will typically increase the processing time.

While the choice for the value "e" is arbitrary (and based on the design of the system), the benefit of being able to combine multiple microelement outputs 42 with weighting factors to generate pixel outputs 48 is an advantage of the current disclosure.

In the system of FIG. 2a, digitizing the readings from the microelements 38 allows the splitting of the microelement outputs 42 so that they can contribute to more than one pixel output 48 as will be described. As can be seen in FIG. 2a, the outputs 42 may contribute to any number of pixel outputs 48 and is dependent on the design or set up of the detector. These outputs 42 may even overlap each other as they are directed to being processed with the weighting factor 50. In one embodiment, the overlapping of the microelement outputs 42 has the effect of a low-pass filter to improve MTF and DQE. The effect that the microelement output 42 has on a pixel output is controlled by the weighting factors such that microelement outputs 42 that are located physically farther from a pixel output 48 has less effect than a microelement output 42 that is physically closer to the pixel output 48. The weighting factor values may be either positive or negative.

With respect to the weighting factors, these factors are preferably chosen or selected to provide a desired characteristic response. For example, the weighting factors may be taken from a sinc function, chosen to suppress spatial frequencies in the output signal above a sampling cut-off frequency of 0.5/a and pass frequencies below this cut-off frequency (rectangular passband). Alternatively, the weighting factors may be chosen to provide a modified frequency response, such as to smooth the response roll-off to reduce Gibbs ringing. In another embodiment, the weighting factors may be selected to enhance or suppress other spatial frequencies to provide improvements in the appearance of an image, such as edge enhancement. Furthermore, they may be selected based on the signal and noise frequency response characteristics of a particular detector to enhance signal-to-noise ratio in the output image. Also, the weighting factors may be functions of X-ray exposure to enhance image quality and may take into consideration the performance characteristics (including, but not limited to, spatial resolution and detector electronic noise) of specific detectors to improve or maximize image quality. The weighting factors may also be chosen in consideration with the reconstruction algorithm used for computed tomography to suppress or enhance specific spatial frequencies.

In the current system, use of the microelements allows for a controlled signal sharing between sensor elements. In other words, signals from each microelement are combined with signals from other microelements using predetermined weighting factors to synthesize detector values (or numerical values) used to generate image pixel values. In this manner, each pixel output 48 is generated by combining the signal measured by several microelements with predetermined weighting factors. In a preferred embodiment, the relationship between a pixel output and the microelement outputs is known or predetermined.

Figure 2B:
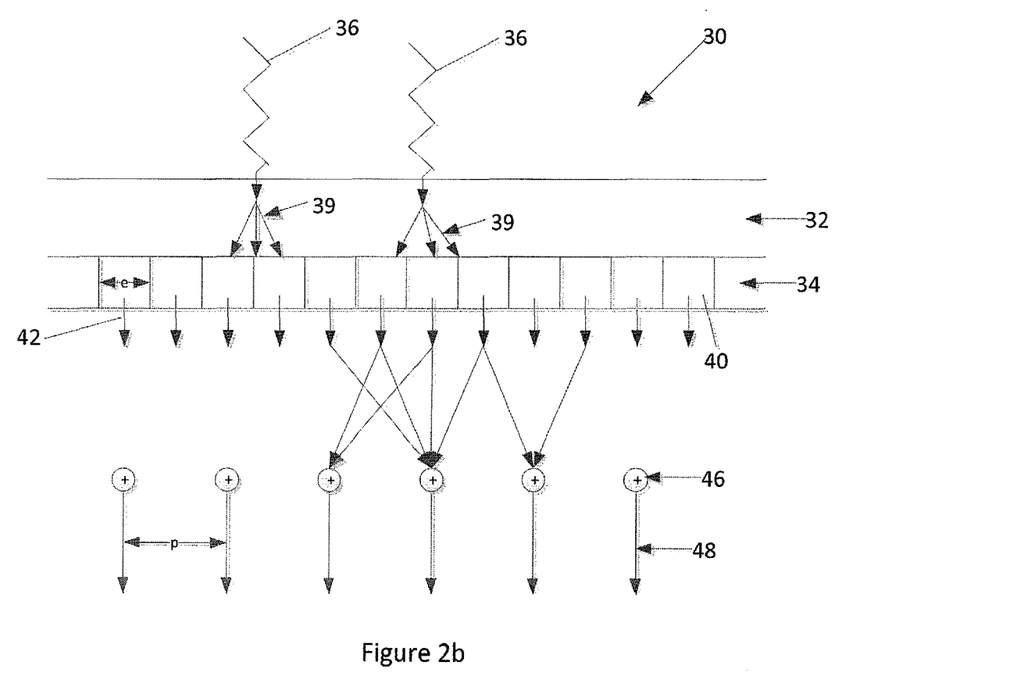
FIG. 2b is a schematic diagram of a second embodiment of an X-ray detector in accordance with the current disclosure.

Turning to FIG. 2b, another embodiment of the disclosure is shown. In the embodiment of FIG. 2b, the system differs from the embodiment of FIG. 2a with the removal of the ADC and the CPU. In the current embodiment, the microelement outputs 42 are in the analog domain but may be connected via hardware circuitry to multiple pixel outputs 48. The design of a system in accordance with FIG. 2b preferably takes into account the weighting factors which are preferably implemented with the hardware circuitry between the microelement output and the pixel output.

Figure 3:
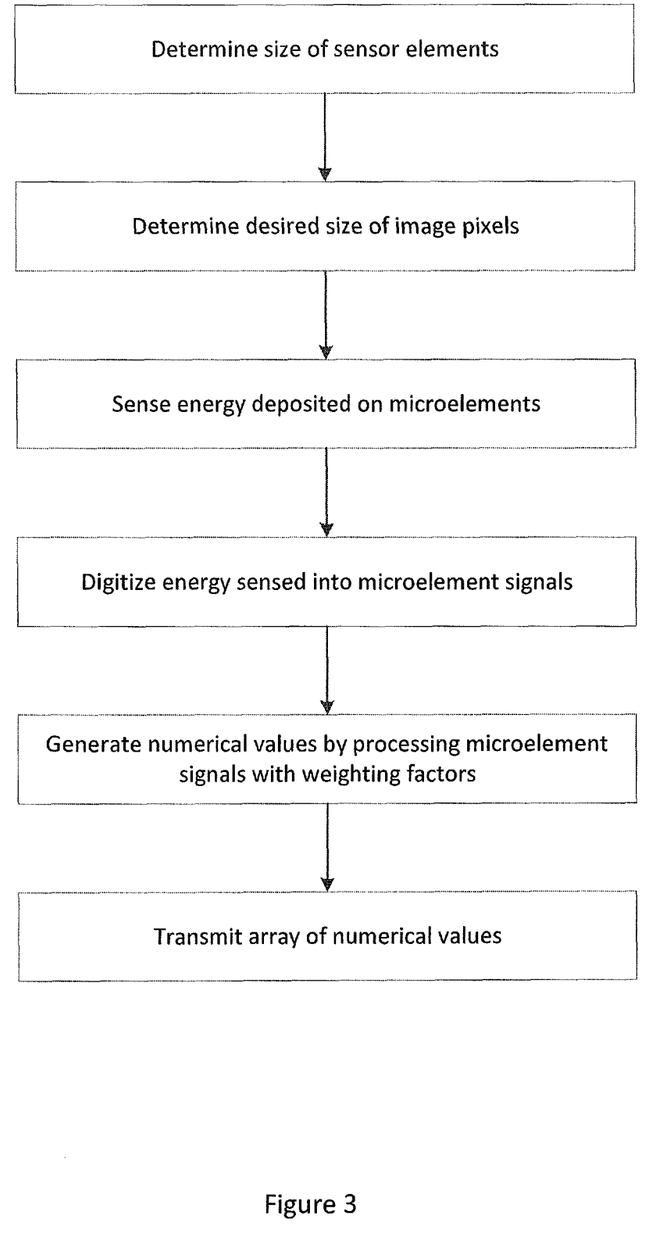
FIG. 3 is a flowchart outlining a method of improving detective quantum efficiency in an X-ray detector.

Turning to FIG. 3, a method of improved MTF and DQE for an X-ray detector is shown. Initially, the size of individual microelements of a detector may be determined (100). As will be understood, the microelements are typically the same size throughout the sensor layer of a detector. For explanation purposes, the microelements may be seen as seen as having a size or spacing "e". After determining the size of the elements, the desired image pixel size "p" is determined. To achieve an improvement in MTF and DQE, "e" must be smaller than "p". For example, but not limited to these examples, e may equal p/2, p/3 or p/4. The value of "e" may also be p/2.7 or p/10.6 whereby "e" may be a non-integer portion of "p".

After the X-ray source has been initiated and delivers X-rays towards the detector, the microelements sense the X-ray energy (or liberate secondary quanta) being deposited on their individual surfaces (104). The energies are then preferably digitized to form a signal based on the readings by each of the surfaces (106). The digitizing may be performed via analog-to-digital (A/D) converters. Alternatively, the digitizing may not need to be performed if the system is implemented in analog using hardware circuitry.

The signals from the microelements are then combined to generate numerical values (or pixel outputs) corresponding to the spacing "p" of the detector using weighted factors (108). As such, the pixel outputs based on the microelement outputs provide a more accurate reading than conventional systems which only take a single reading by a single physical element rather than multiple weighting factored readings by microelements to generate the reading. The processing of these signals with the weighting factors provides benefits which have not been previously realized.

In one embodiment, after the microelement outputs have been digitized, the pixel outputs may be calculated by adding a set of predetermined weighting factored microelement outputs. In other words, based on the design of the detector, each pixel output is calculated by retrieving predetermined microelement outputs 42 and then applying a weighting factor to each of the retrieved predetermined microelement outputs 42 and then adding these values together.

More specifically, the generating of numerical values using weighted factors may be a discrete convolution of the signal(s) from the microelement(s) with a kernel including the weighting factors followed by a re-sampling. Alternatively, the generating of the numerical values (108) may be performed as a non-linear convolution if the weighting factors themselves are functions of a measured signal or other quantity. In another embodiment, the generation of the numerical values may be performed by taking a Fourier transform of the digitized signals from the microelements followed by multiplication by the Fourier transform of the weighting functions (a function describing the desired passband of the AAP filter) followed by inverse Fourier transforms to generate the output array of numerical values. These pixel outputs are then transmitted, such as in an array, to a processor where they may be further processed (110).

Benefits of the disclosure along with sample calculations are outlined below.

The DQE of digital detectors is normally expressed as a function of spatial frequency up to the sampling cut off frequency $u_c$ where $u_c = 0.5/a$ [cycles/mm] and a [mm] is the width of one image pixel. A standard expression for the DQE is given by:

$$DQE(u) = \frac{|T(u)|^2}{XQ_o W(u)/\bar{d}^2} = DQE(0)\operatorname{sinc}^2(au) \quad (1)$$

where detector readout noise is assumed negligible, T(u) is the system modulation transfer function (MTF), X is the x-ray exposure incident on the detector, Qo is the number of x-ray quanta per unit area and per unit exposure in the x-ray spectrum, W(u) is the Wiener image noise power spectrum (NPS) corresponding to a uniform exposure X and average image pixel value d.

When spatial spreading of secondary scatter is negligible and the modulation transfer function (MTF) is determined primarily by the pixel aperture size (such as with selenium-based detectors), $|T(u)|=|\operatorname{sinc}(au)|$ and the DQE can be described using the cascaded system as $DQE(u)=DQE(0)\operatorname{sinc}^2(au)$. In this example, the DQE value falls to the fraction $\operatorname{sinc}^2(au_c)=\operatorname{sinc}^2(0.5)=4/\pi^2 \approx 0.41$ at the sampling cut-off frequency relative to the zero-frequency value, due to noise aliasing. This results in additional high-frequency noise that gives images from selenium-based detectors their characteristic high-frequency noise structure.

Figure 4:
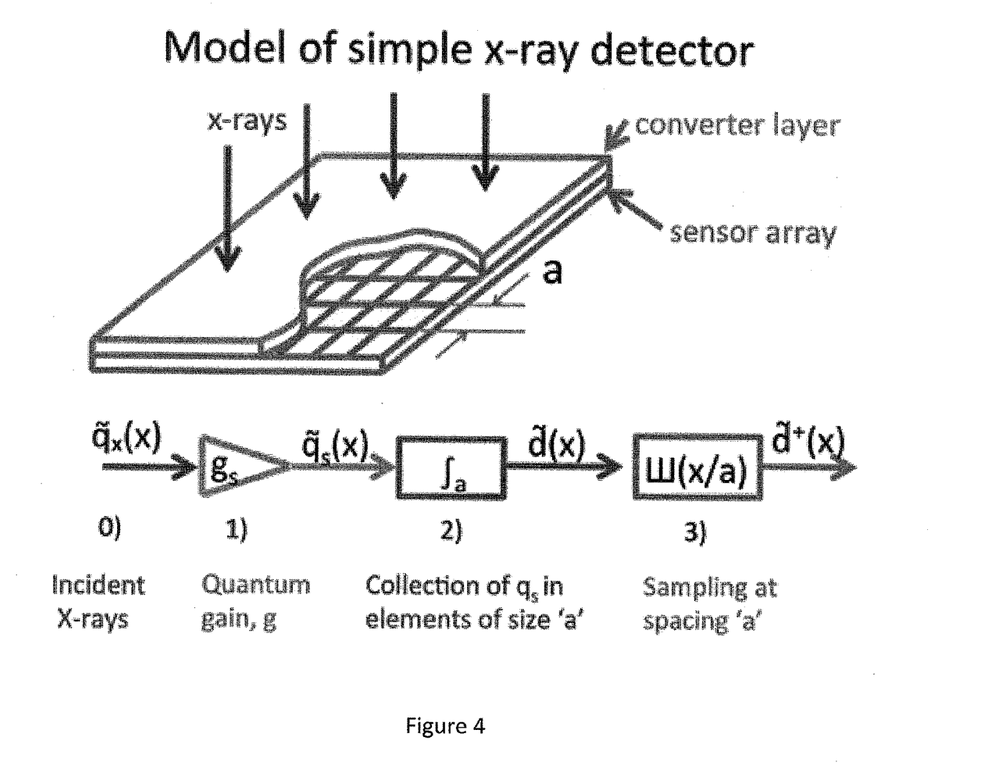
FIG. 4 is a schematic diagram of a conventional detector in which x-ray photons interact and deposit energy in a converter layer.

FIG. 4 illustrates a conventional detector in which X-ray photons interact and deposit energy in a converter layer, typically made of selenium (Se), cesium iodine (CsI), gadolinium oxysulfide ($Gd_2O_2S$) based materials. In this example, the sensor element size a corresponds directly to image pixel size.

Figure 5:
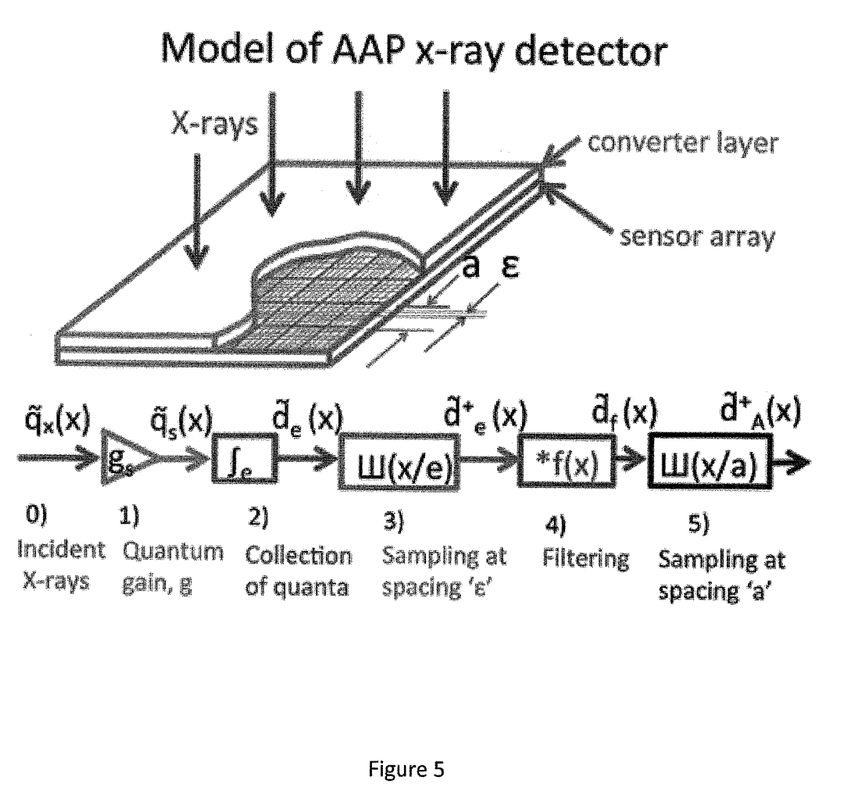
FIG. 5 is a schematic diagram of another embodiment of a detector in accordance with the disclosure.

FIG. 5 illustrates an AAP detector in accordance with the disclosure. It has a similar conversion layer but the sensor elements of size e are smaller than the desired image pixels.

Figure 6:
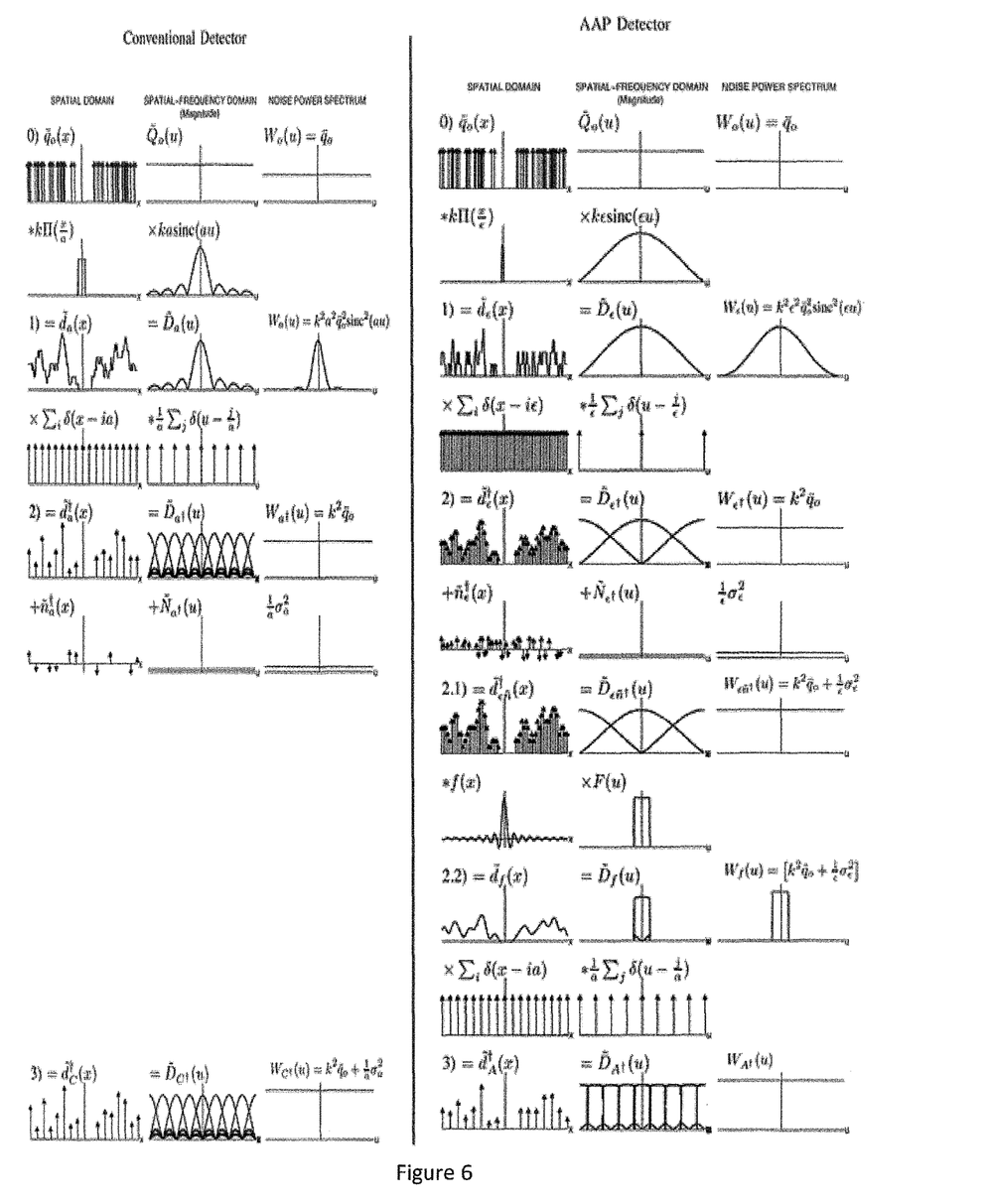
FIG. 6 are diagrams showing performance of both a conventional and AAP detector in which signal and noise propagation through a cascade of simple physical processes in spatial and spatial-frequency domains.

The performance of both a conventional and AAP detector may be described using a cascaded-systems analysis (CSA) model in which signal and noise propagation through a cascade of simple physical processes is described in spatial and spatial-frequency domains as illustrated in FIG. 6. The input to each model is a spatial distribution of x-ray quanta $\tilde{q}_o(x)$, where each x-ray photon is represented as a Dirac δ-function. As described, the overhead is used to indicate a random variable or function. One-dimensional (x) illustrations are used for simplicity but all results are also applicable in two dimensions (x,y). The output from the model is $\tilde{d}^\dagger(x)$, a sequence of uniformly-spaced δ-functions scaled by associated discrete numerical values representing image pixel data. The superscript † is used to indicate a function including only scaled δ-functions representing discrete sensor or pixel values.

For each model, the three columns represent: i) image signal in the spatial domain; ii) image signal in the spatial-frequency domain (magnitude only); and iii) Wiener noise power spectrum, respectively.

The input to each model is $\tilde{q}_o(x)$, a point process representing a Poisson random distribution of x-ray quanta incident on the detector:

$$\tilde{q}_o(x) = \sum_{n=1}^{\tilde{N}_o} \delta(x-\tilde{x}_n), \quad (1)$$

where each incident photon is represented as a Dirac δ-function, and $\tilde{x}_n$ is a random variable (RV) describing the coordinate of the nth of $\tilde{N}_o$ photons. The overhead tilde () is used to indicate a RV and overhead bar () is used to indicate an expectation value. In practice, $\tilde{x}_n$ is not uniformly distributed, reflecting the non-uniform x-ray transmission through a patient, but for Fourier metrics of signal and noise, a shift invariance and wide-sense stationary noise are processes are assumed, requiring that $\tilde{x}_n$ be distributed with uniform probability over an infinite detector that is represented as having width L in the limit L→∞. Therefore, $\bar{N}_o \approx \bar{q}_o L$.

The Fourier transform of $\tilde{q}_o(x)$ is $\tilde{Q}_o(u)$, the superpostion of the Fourier transform (FT) of many shifted δ-functions. Application of the Fourier shift theorem shows the FT of each δ-function has unity magnitude and phase $e^{-i2\pi\tilde{x}_n u}$, giving $$\tilde{Q}_o(u) = \mathscr{F}\{\tilde{q}_o(x)\} = \sum_{n=1}^{\tilde{N}_o} e^{-i\pi\tilde{x}_n u} \quad (2)$$

and $|\tilde{Q}_o(u)|=\tilde{N}_o$, which is independent of frequency. The Wiener NPS of $\tilde{q}_o(x)$ is $W_{q_o}(u)=\tilde{q}_o$. For each, it is assumed that all incident x-ray quanta interact (unity quantum efficiency) in an ideal converter layer such that each sensor element is an ideal photon counter. This assumption is convenient for describing the detector of the disclosure but is not a requirement for its use. The DQE of a conventional detector that will be obtained with an ideal converter is given by $DQE_C(u)$ where $$DQE_C(u) = \frac{MTF_C^2(u)}{W_C^{(n)}(u)} = \frac{\operatorname{sinc}^2(au)}{1+\frac{\sigma_a^2}{k^2 a q_o}}. \quad (16)$$

For the detector of the disclosure, the AAP detector is also represented as an array of photon-counting sensor elements, but with elements of size e where e<a. Evaluation of image pixel values from sensor data is determined by a discrete convolution operation, represented as the combination of a convolution integral (as seen in 2.1 in FIG. 6) and evaluation of the convolution integral at uniform spacings a (as seen 2.2 in FIG. 6). Similar to $\bar{d}_e(x)$, the intermediate presampling result $\bar{d}_f(x)$ is not physically accessible. The output from the AAP detector is therefore given by:

$$\tilde{d}_A^\dagger(x) = [\tilde{d}_{e\bar{n}}^\dagger(x) * f(x)] \times \sum_i \delta(x-ia) \quad (17)$$

and:

$$\tilde{D}_{A^\dagger}(u) = \frac{1}{a}\tilde{D}_{e\bar{n}^\dagger}(u)F(u) + \frac{1}{a}\sum_{j=1}^{\infty}\tilde{D}_{e\bar{n}^\dagger}\left(u\pm\frac{j}{a}\right)F\left(u\pm\frac{j}{a}\right). \quad (18)$$

Since $$W_f(u) = \left[k^2\bar{q}_o + \frac{1}{\epsilon}\sigma_\epsilon^2\right]\times F^2(u), \quad (19)$$

the corresponding normalized NPS is given by:

$$W_{A^\dagger}^{(n)}(u) = \left[1+\frac{\sigma_\epsilon^2}{k^2\epsilon\bar{q}_o}\right]\left\{\frac{F^2(u)}{F^2(0)} + \sum_{j=1}^{\infty}\frac{F^2\left(u\pm\frac{j}{a}\right)}{F^2(0)}\right\}. \quad (20)$$

The MTF of the AAP detector is therefore given by $$MTF_A(u) = \frac{1}{k\epsilon} \frac{\overline{D_\epsilon}(u) F(u)}{\overline{Q_o} F(0)} = \frac{F(u)}{F(0)} \text{sinc}(\epsilon u) \quad (21)$$

where F(0) is the zero-frequency value of F(u) and the variable ε is used to indicate "e". The DQE is a little more complex with the AAP detector due to the use of filter F(u) and the combined effects of aliasing from sampling at spacings of both a and ε. However, inspection of Equation (20) shows that a good choice of F(u) would be a low-pass filter that blocks all frequencies above the sampling cut-off frequency $u_c = 0.5/a$ to avoid noise aliasing from resampling at spacings a from being shifted into frequencies below $u_c$. The DQE is then given by $$DQE_A(u) = \frac{MTF^2(u)}{W_{A\dagger}^{(n)}(u)} = \frac{\text{sinc}^2(\epsilon u)}{1 + \frac{\sigma_\epsilon^2}{k^2 \epsilon \overline{q}_o}}. \quad (22)$$

Figure 7:
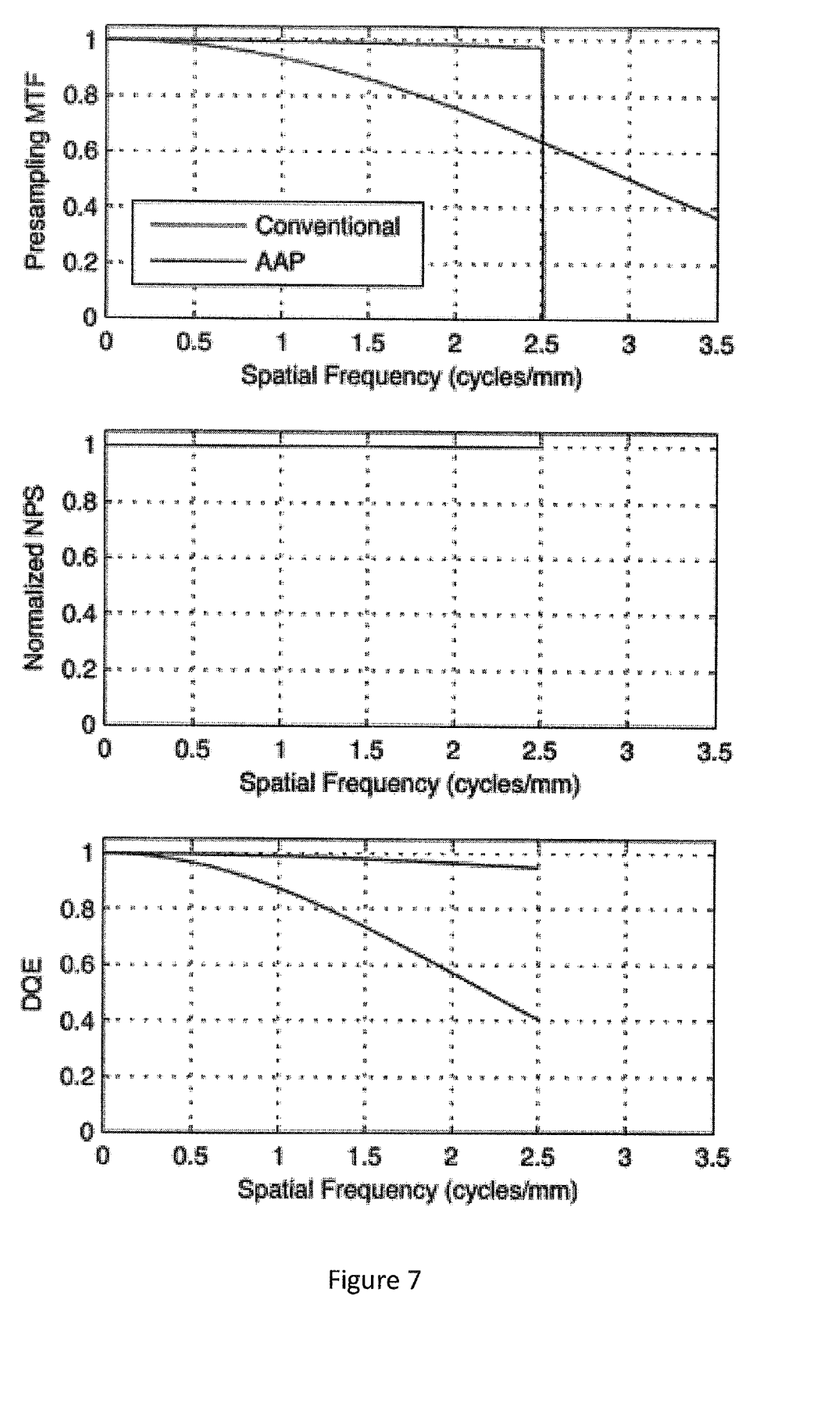
FIG. 7 are a set of graphs showing theoretical MTF, normalized NPS, and DQE, between an AAP detector and a conventional detector (assuming negligible read-out noise and ideal converter layer)

This result shows the frequency response of the filter does not affect the DQE as long as it describes a low-pass filter with cut-off frequency $u_c = 0.5/a$, and that since ε<a, an AAP detector is less tolerant of readout noise than a conventional detector.

The presampling MTF, normalized NPS and DQE curves predicted by the CSA model for conventional (binned) and AAP detectors (rectangular low-pass filter, ε=50 μm and a=200 μm) are illustrated in FIG. 7. The conventional MTF follows the sinc(au) shape given by Equation (15) while the AAP MTF follows sinc(εu) up to the cut-off frequency $u_c = 0.5/a$, given by Equation (21). Thus, while the AAP method results in an MTF increase by the factor sinc(εu)/sinc(au), equal to a 53% increase at the cut-off frequency, it also removes signal aliasing from the image if present.

For purposes of illustration, the NPS was estimated assuming negligible read-out noise. The normalised NPS in FIG. 7 is independent of frequency for both conventional and AAP detectors. It may be slightly greater than unity for the AAP detector due to the additive effect of read-out noise. It is important to note that the normalized NPS is the same for both detectors with the exception of readout-out noise. This means that with the same display contrast settings, conventional and AAP images will appear to have the same quantum noise. The DQE curve shows the predicted improvement with frequency for the AAP detector. If read-out noise is negligible, the DQE is increased by the factor $\text{sinc}^2(\epsilon u)/\text{sinc}^2(au)$, equal to a 2.5× increase at the image sampling cut-off frequency.

Figure 8:
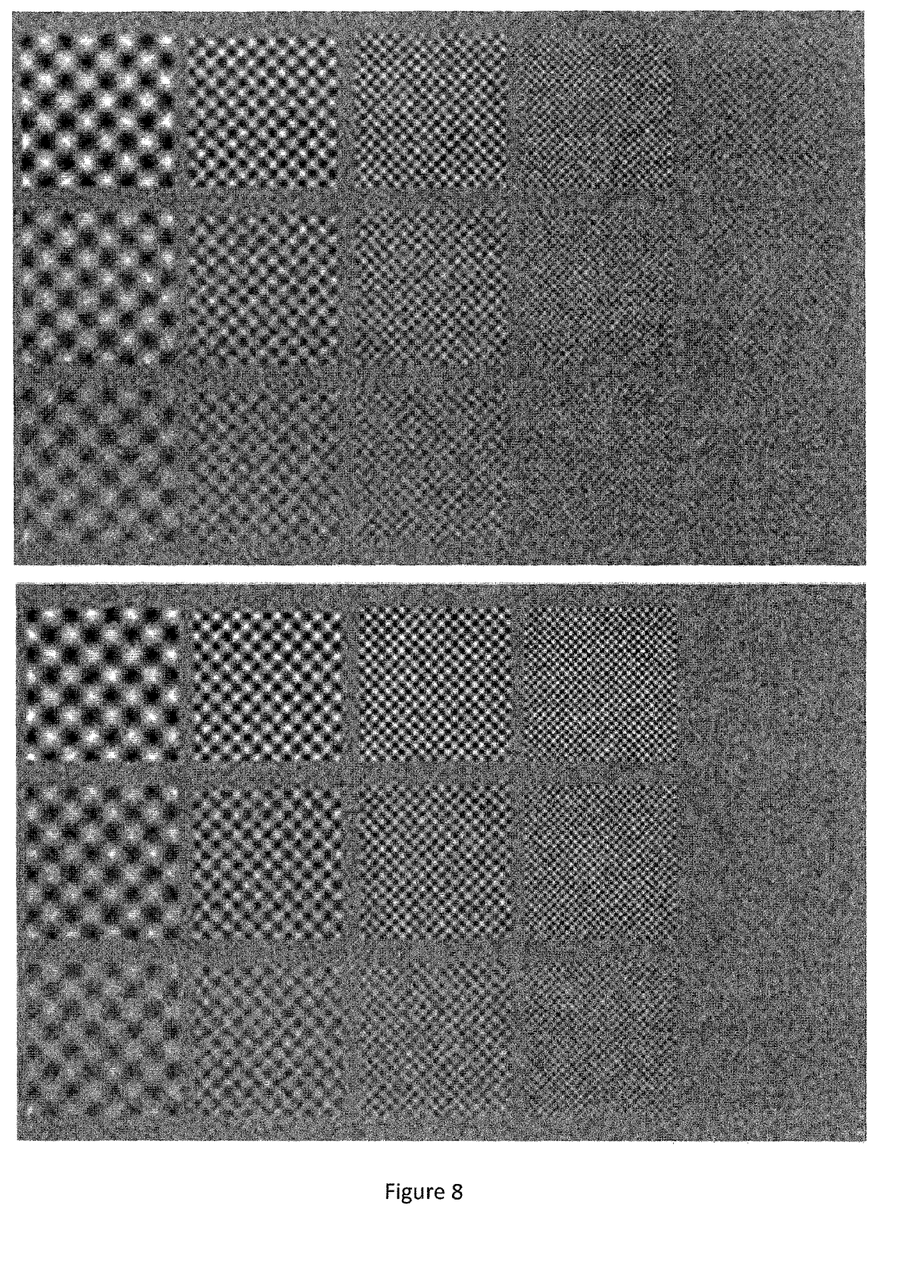
FIG. 8 are a pair of simulated images showing a visual impact of the detector of the disclosure.

For the AAP detector, the converter layer may also affect the MTF and DQE. The results shown here correspond to a very high-resolution converter layer. If the converter layer results in lateral scatter of secondary image quanta (eg light photons in a phosphor or charge migration in a photoconductor), the results may differ slightly. However, the AAP design results in improved MTF and DQE in all cases.

One advantage of the disclosure over conventional detectors is in visual impact. The visual impact of the expected DQE improvement is illustrated with a simple simulation in FIG. 8 corresponding to e=50 μm with no read-out noise and p=200 μm pixels. Each image had 15 two-dimensional sinusoidal test patterns in three rows of different amplitudes and five columns of different spatial frequencies. Frequencies of 1.0, 1.5, 2.0, 2.4 and 3.0 cycles/mm were chosen to be below, just below, and above the sampling cut-off frequency of 2.5 cycles/mm. Patterns in the rows from top to bottom had amplitudes of 60, 100, and 140 pixel values while white Gaussian noise was added with standard deviation of 100 in the raw 50-μm sensor signals to simulate noise-limited images at each frequency. The AAP filter was chosen as a rectangular low-pass filter with unity height and flat frequency response up to the sampling cut-off frequency $u_c = 0.5/a$.

A further embodiment of AAP detector design is now disclosed. In the current disclosure, a method of creating apodized apertures with the goal of increasing high-frequency MTF and DQE values as illustrated and described with respect to FIGS. 5 and 6 is disclosed. The method uses sensor arrays having sensor elements of size c smaller than the desired pixels of size p. This could be achieved, for example, using a CMOS sensor array that can have elements as small as 10-25 μm. While this corresponds to a sampling cut-off frequency of 20-50 cycles/mm, it is unlikely this high resolution will have any clinical significance and the patient exposure required to achieve high SNR in such images would likely be prohibitive in most applications. In addition, the workloads in radiology departments would make the archival, transmission and display of such large image files less beneficial or prohibitive. The disclosure is directed at a method of digitizing and processing sensor-element data either directly on the sensor array, or as post-processing within the imaging system, to synthesize image pixels that are larger than the sensor elements using an algorithm that will increase the MTF and reduce noise aliasing, and thereby increase the DQE. In the preferred embodiment, the converter layer has very high spatial resolution (no spatial spreading of secondary quanta such as optical scatter in a phosphor or charge migration in a photoconductor) such that resolution is largely determined by element size, even with the small elements or microelements. Thus, selenium may be a preferable material for the conversion layer, although some benefit may be achieved with other materials as well. There may also be substantial benefit from this approach with a CsI or other converter when using x-ray energies below the K-edge energies of the converter materials, such as for mammography imaging.

Simple binning of small sensor elements does not increase the MTF or DQE at the sampling cut-off frequency in an embodiment of the disclosure cascaded model compared to a conventional detector with pixels the same size. Regardless of the number of elements binned or element size, the DQE at $u_c$ with an ideal converter layer remains less than half of the zero-frequency value due to the since shape. To improve the MTF and DQE, the apodized-aperture pixel (AAP) design in which data is acquired in sensor elements of size c and then processed to synthesize image pixels of size p is used. The sensors preferably have extremely low readout noise to ensure a high DQE value, something else that can be achieved with CMOS sensors. The signal and noise characteristics in both spatial and spatial-frequency domains are illustrated in FIG. 6.

In one specific embodiment of the disclosure, signals from the microelements, $\tilde{d}_\epsilon^\dagger(x)$, is subsequently convolved with a filter kernel f(x) to generate a presampling function $\tilde{d}_f(x)$, which is subsequently evaluated at spacings a to generate the output signal $\tilde{d}_A^\dagger(x)$ consisting of a sequence of Dirac δ-functions on spacings a scaled by the discrete detector output values $\tilde{d}_{A,n}$. In practice, the discrete values $\tilde{d}_{A,n}$ are synthesized by a numerical convolution of the discrete values from each small element with a discrete vector $f_i$.

Experimental validation of the AAP design was performed on two detectors. The first was a CMOS-based panel having 50 µm sensor elements with a 0.5-mm CsI converter layer. Images having 200 µm pixels were synthesized using a rectangular low-pass filter with cut-off frequency 2.5 cycles/mm. The MTF and DQE were measured for a detector exposure of 4 µGy air KERMA with an RQA-5 spectrum (70 kV, 2 mm added Al, 6.4 mAs, 7.1 mm Al HVL, 150 cm source-image distance). For comparison, conventional images having pixels of the same 200 µm size were generated using 4×4 binning of the sensor data from the same raw images. All images were gain and offset corrected. Additive read-out noise was verified to be negligible relative to x-ray quantum noise.

The same comparison was made using a Se-based clinical mammography detector having 70 µm sensor elements with a Se converter layer and amorphous silicon sensor array. Images having 280 µm pixels were synthesized using both AAP and 4×4 binning methods. The MTF and DQE were measured using 90 µGy air KERMA with an IEC W/Rh spectrum (28 kV, 2 mm added Al, 24 mAs, 0.75 mmAl HVL, 65 cm source-image distance, no grid) with known methods for mammography used for calculating the DQE.

The utility of the illustrations in FIG. 6 show that the frequency response of both signal and noise that can be obtained with each method, including the DQE. The benefits of the AAP approach can be determined by comparing these two figures as they are plotted with the same spatial and spatial-frequency scales. The left column in each figure shows propagation of the same random distribution of incident x-ray quanta. The frequency response of the micro-elements is much broader than that of larger elements, seen by comparing $\tilde{D}_\epsilon(u)$ (in 2.1 of FIG. 6) for the AAP detector in FIG. 6 with $\tilde{D}_a(u)$ (at 2 of FIG. 6) for the conventional detector. By choosing the sinc-shaped kernel $f(x)=\text{sinc}(x/a)$ as illustrated, we obtain a low-pass filter that passes frequencies below the image cut-off frequency $u=0.5/a$ with equal weighting while blocking all frequencies above. This increases the DQE by preserving the superior frequency response of the small elements (aperture MTF) and reducing noise aliasing.

The output image signal and noise are illustrated in the bottom row. While both detector designs have the same number of image pixels, and on the same spacings a, pixel values of the AAP detector $\tilde{d}_A^\dagger$ differ to those of the conventional detector $\tilde{d}_a^\dagger$ in subtle ways due to differences in frequency response and the reduction of signal aliasing. The frequency response of each is seen in the central column where $\tilde{D}_{A^\dagger}(u)$ has a more uniform fundamental spectral component compared to the conventional detector. In addition, there is less overlap of higher-order aliases which is responsible for the reduced signal aliasing. Similar to the conventional detector, the Wiener NPS is also independent of frequency. Thus, the appearance of noise in a selenium-based AAP image (compared to a conventional detector with the same pixel size) would be unchanged, even though noise aliasing is largely reduced. Rather, the MTF is improved, resulting in a DQE improvement.

FIG. 7 shows a comparison of the theoretical DQE obtained using the AAP approach ($\epsilon=0.05$ mm, $a=0.2$ mm) with a conventional detector ($a=0.2$ mm). There is no difference in the zero-frequency DQE value while the high-frequency DQE value is increased by a factor of almost 2.5. This result assumes unity quantum efficiency. The actual DQE obtained in practice would be the theoretical DQE shown in this illustration scaled by the quantum efficiency.

As mentioned above, an improvement in visual impact is experienced when the method and apparatus of the disclosure is used. In the simulated images in FIG. 8 compare the visual appearance of conventional (binned, upper) and AAP (lower) methods. One observation is that noise in both images are indistinguishable. This is expected as they each have a flat NPS and images are shown with the same display windows. The conventional image shows decreasing contrast with increasing frequency in the first four columns as expected, and the fifth column shows a pattern that has been aliased to a lower frequency.

Figure 9:
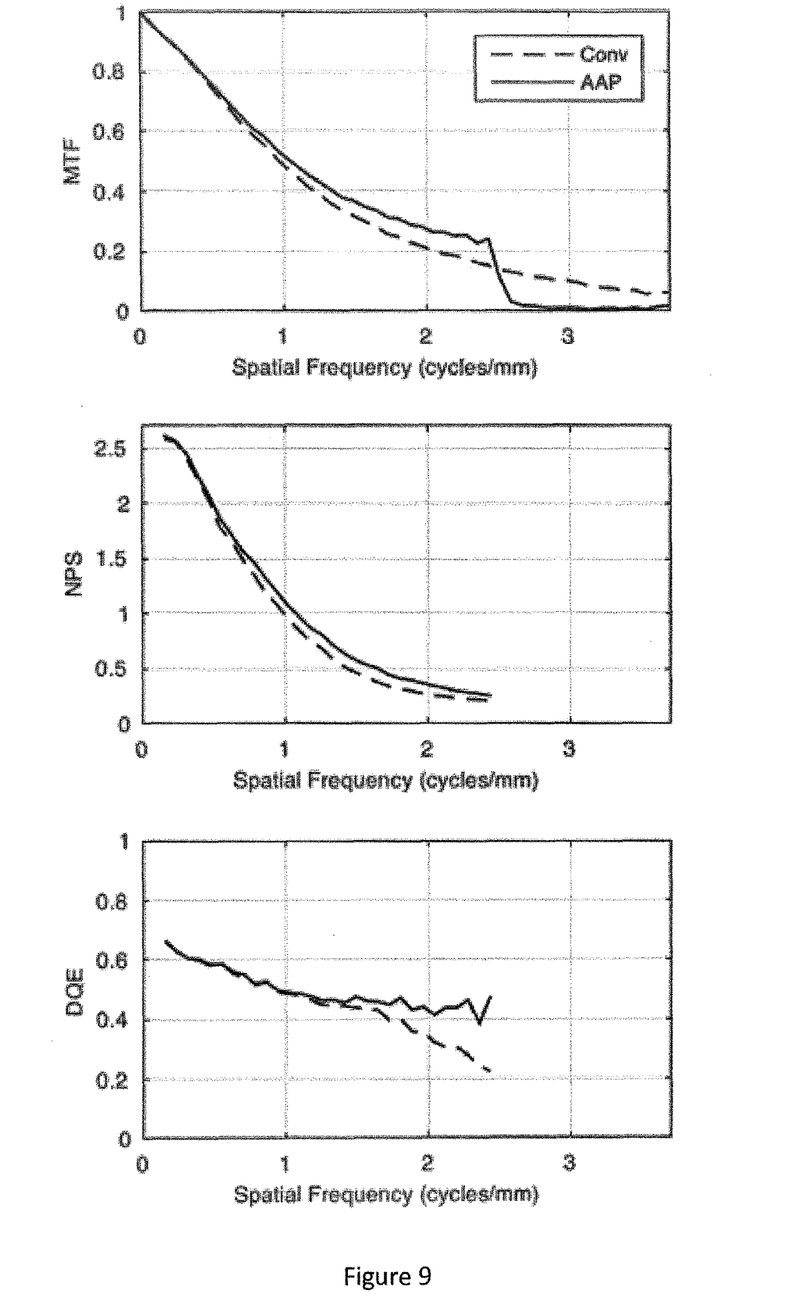
FIG. 9 are graphs showing experimental data obtained with a cesium-iodide based AAP detector.
Figure 10:
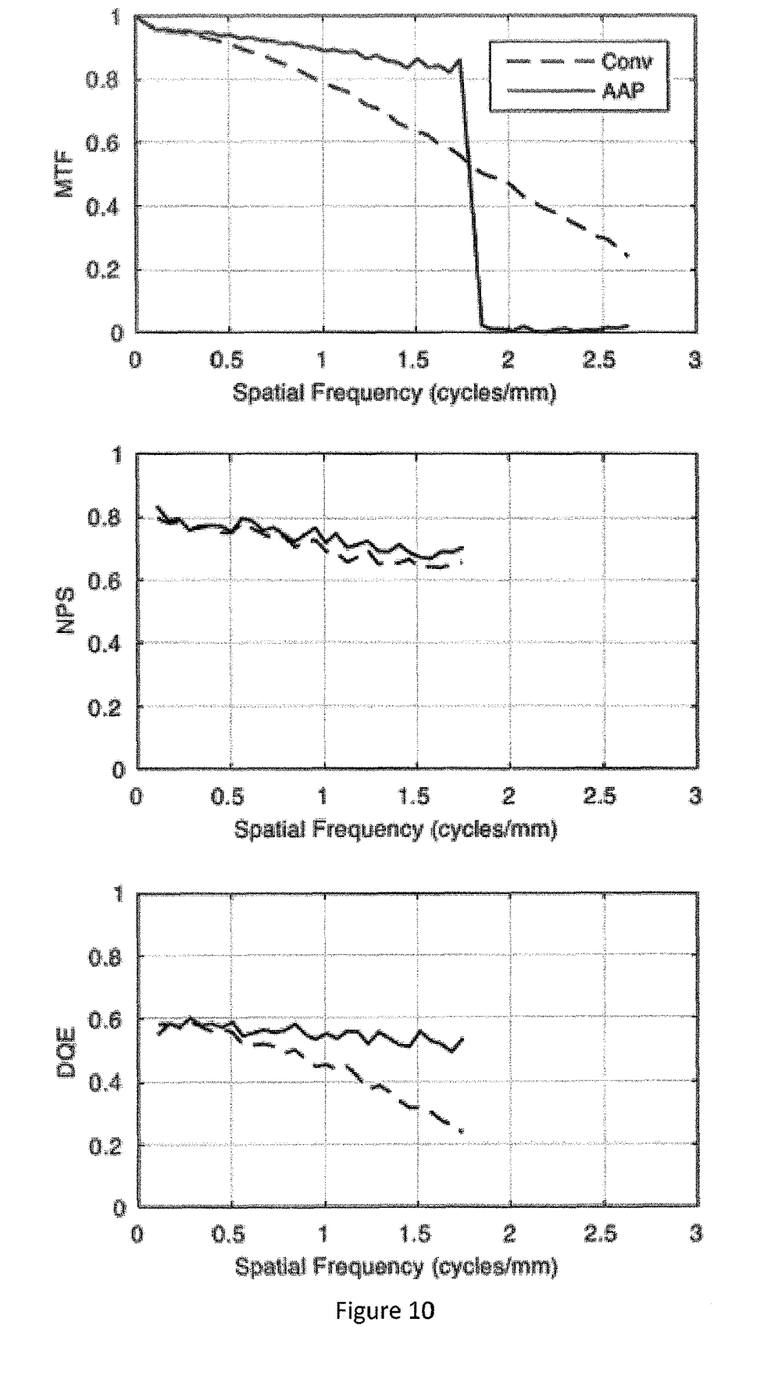
FIG. 10 are graphs showing experimental data obtained with a selenium based AAP detector.

In comparison, the AAP image shows very little change in contrast with frequency in the first four columns, consistent with the expected flatter MTF. However, the pattern in the fifth column has been removed completely as it contains frequencies above the sampling cut-off frequency $u_c$, and is therefore removed from the image by the AAP filter $F(u)$. This observation gives confidence in the ability of the filter to block all frequencies above $u_c$, in both signals and noise.

Specific experimental data is shown in FIGS. 9 and 10. With respect to FIG. 9, the CMOS/CSI detector experimental validation is reflected in the presampling MTF, NPS, and DQE curves obtained with the CMOS/CsI detector, comparing conventional (binned) and AAP methods. Optical scatter in the CsI converter layer reduces spatial resolution and hence the measured MTF decreases with frequency more quickly than the theoretical model of Eq. (15) which does not include a converter. The AAP MTF shows a modest improvement only, although it does show the low-pass characteristic of the AAP method as frequencies above $u_c=0.5/a$ are removed from the image. The AAP shows only a modest improvement over the conventional MTF because the MTF of this detector is determined largely by optical resolution characteristics of the CsI converter layer. As a consequence, there is very little noise aliasing, and the DQE, while still improved by a factor of two at the cut-off frequency from 0.2 to 0.4, is less than what is predicted by Equation (22).

With respect to FIG. 10, experimental results from a Se detector experimental validation are shown. Results obtained with the Se detector are closer to the theoretical prediction as the Se converter layer result in very little loss of spatial resolution making it closer to an ideal converter layer. FIG. 10 shows measured presampling MTF, NPS, and DQE curves comparing conventional (binned) and AAP methods measured using the Se detector. The conventional MTF is similar to the theoretical curve of Equation (15) and the AAP MTF is closer to Equation (21) including the low-pass cut-off frequency of $u_c=0.5/a\approx1.8$ cycles/mm. The NPS is relatively flat for both conventional and AAP images, and the DQE at $u_c$ is approximately doubled from 0.25 to 0.5, resulting in a DQE that is almost independent of frequency.

As disclosed, the method and apparatus of the disclosure may be beneficial for detectors having substantial computational ability and where sensor elements can be manufactured smaller than what might be of practical value for clinical imaging. For example, the high-frequencies available with full-size detectors having 25 µm sensors (20 cycles/mm) may have no direct clinical value, and the resulting file sizes may be too large for practical display, transmission and storage at present. The method of the disclosure may provide an architectural approach in which image pixels are separated from physical sensor elements. On CMOS and other new detector designs with very small sensors this may be a way to exploit the information available to improve the DQE at frequencies of practical importance. The synthesis of larger pixel values could take place in real time, directly on the detector, reducing or eliminating the need for very high data-transfer bandwidths in the readout systems.

Advantages of the disclosure include but are not limited to, an improvement in the presampling MTF due to the superior frequency response of the small sensor elements. Another advantage is that use of a sinc-shaped kernel when synthesizing larger image pixels preserves the improved MTF and blocks frequencies above the image sampling cut-off frequency of $u_c=0.5/a$ for images with pixel size a. As a result, the presampling MTF does not extend beyond this frequency which reduces spectral-aliasing artifacts in the images. Also, noise aliasing is largely removed from the image although the Wiener NPS remains flat over all spatial frequencies. Another advantage is that low-frequency DQE values are not affected by the AAP algorithm, however DQE values at the cut-off frequency are increased by a factor of up to 2.5×. Based on experimental data, for a CMOS/CsI-based detector with 0.05-mm elements by comparing 4×4 binning to simulate a 0.2-mm detector with the AAP approach to synthesize images with the same pixel size, the high-frequency DQE was increased from 0.2 to 0.4. Also based on experimental data, for a Se-based detector with 0.07-mm elements by comparing 4×4 binning to simulate a 0.28-mm detector with the AAP approach to synthesize images with the same pixel size, the high-frequency MTF was increased from 0.5 to 0.8 and the high-frequency DQE was increased from 0.22 to 0.52.

In a preferred embodiment, the method is implemented, or executed, directly on the detector sensor array. This requires converting the signal acquired by each physical sensor element to a digital value, and using the data from many sensor elements to synthesize image pixels that are larger than the sensor elements. This calculation (or weighting factor processing) may be performed as a convolution with a filter kernel or by taking the Fourier transform of physical sensor data, multiplying by the filter transfer function, and taking the inverse Fourier transform. The filter kernel shape can be designed to maximize the DQE under specific detector conditions, such as level of readout noise, shape of the MTF, and shape of the Wiener noise power spectrum (in particular, the relative contributions from correlated and uncorrelated noise). In a preferred embodiment, the filter can be optimized using the cascaded model similar to that outlined in this disclosure to maximize the MTF and/or DQE, or other methods such as an interactive approach that changes the filter kernel until the DQE or DQE area is increased or maximized. The filter can also be used to shape the MTF and NPS and DQE. For example, it may be preferable to make the MTF and NPS and DQE drop to zero more smoothly near the sampling cut-off frequency. This may reduce of minimize Gibbs ringing and other artifacts that may result from an anti-aliasing filter having a sharp low-pass filter frequency response.

In the preceding description, for purposes of explanation, numerous details are set forth in order to provide a thorough understanding of the embodiments. However, it will be apparent to one skilled in the art that these specific details may not be required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:

1. A method of improving modulation transfer function (MTF) and detective quantum energy (DQE) in an X-ray detector comprising:
   sensing X-ray energy received by a set of microelements;
   generating a microelement output for each of the set of microelements based on the sensed X-ray energy; and
   generating a set of pixel outputs for a desired pixel image size, each of the set of pixel outputs based on at least two weighting factored microelement outputs from at least two of the set of microelements, wherein at least two microelements form a single pixel.

2. The method of claim 1 wherein generating a set of pixel outputs comprises:
   retrieving a set of microelement outputs;
   applying a weighting factor to each of the retrieved microelement outputs to generate a set of weighting factored microelement outputs; and
   calculating a sum of the set of weighting factored microelement outputs.

3. The method of claim 2 wherein the weighting factor comprises at least one of a sinc function, a weighting factor to provide a modified frequency response weight factor to enhance or suppress other spatial frequencies; a weighting factor to enhance signal-to-noise ratio in the output image or a weighting factor to enhance image quality.

4. The method of claim 1 further comprising:
   transmitting the set of pixel outputs.

5. The method of claim 1 wherein generating a microelement output comprises:
   determine a level of energy sensed by the microelement; and
   digitizing the level of energy sensed to generate the microelement output.

6. The method of claim 1 wherein a size of a microelement is less than the size of a desired pixel image size.

7. The method of claim 1 wherein each of the microelements is a detector element that is smaller than a displayed image pixel.

8. A detector for use in improving modulation transfer function (MTF) and detective quantum energy (DQE) in an X-ray detector comprising:
   a converter layer for receiving X-ray energy and for liberating secondary quanta; and
   a sensor layer including a set of microelements for sensing the secondary quanta to generate microelement outputs for calculation of a set of pixel outputs for a desired pixel image size, each of the set of pixel outputs based on weighting factored microelement outputs from at least two of the set of microelements, wherein at least two microelements form the desired pixel image size for a single pixel;
   wherein a size of each of the set of microelements is less than the desired image pixel size.

9. The detector of claim 8 further comprising at least one analog-to-digital (A/D) converter for digitizing energy sensed by the set of microelements to microelement outputs.

10. The detector of claim 9 further comprising a central processing unit for generating a set of pixel outputs.

11. The detector of claim 8 wherein each of the microelements is a detector element that is smaller than a displayed image pixel.

\* \* \* \* \*